United States Patent
Stuppi et al.

(10) Patent No.: US 9,535,282 B1
(45) Date of Patent: Jan. 3, 2017

(54) QUANTUM DOT NANO CRYSTAL LCD BACKLIGHT SYSTEM AND RELATED METHOD

(71) Applicants: Albert N. Stuppi, Springville, IA (US); Tracy J. Barnidge, Cedar Rapids, IA (US)

(72) Inventors: Albert N. Stuppi, Springville, IA (US); Tracy J. Barnidge, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 194 days.

(21) Appl. No.: 14/020,216

(22) Filed: Sep. 6, 2013

(51) Int. Cl.
   *G02F 1/1335* (2006.01)

(52) U.S. Cl.
   CPC ... *G02F 1/133553* (2013.01); *G02F 1/133617* (2013.01); *G02F 2001/133521* (2013.01); *G02F 2001/133614* (2013.01); *G02F 2203/055* (2013.01)

(58) Field of Classification Search
   CPC ............ G02F 2001/133614; G02F 2202/36; G02F 1/133617; G02F 1/133555; G02F 2001/133557
   See application file for complete search history.

(56) References Cited

U.S. PATENT DOCUMENTS

| | | | |
|---|---|---|---|
| 2008/0094528 A1* | 4/2008 | Robinson et al. | 349/1 |
| 2011/0299011 A1* | 12/2011 | Weiss et al. | 349/62 |
| 2012/0287381 A1* | 11/2012 | Li | G02F 1/133617 349/106 |
| 2013/0335677 A1* | 12/2013 | You | 349/65 |

\* cited by examiner

*Primary Examiner* — Wen-Ying P Chen
(74) *Attorney, Agent, or Firm* — Angel N. Gerdzhikov; Donna P. Suchy; Daniel M. Barbieri (57) ABSTRACT

A system and method are disclosed employing a dielectric mirror layer, highly reflective at wavelengths below a cut off but highly transparent at wavelengths above the cut off, is placed within a display assembly. This dielectric mirror layer creates a very efficient reflecting cavity for a portion of a Light Emitting Diode (LED) pumping spectrum. Accurate dielectric filter tuning allows an increased portion of the pumping spectrum to be converted to desired wavelength spectrum and also raise the luminance ratio of the display to a useful value for display applications. Variable and active tuning of the cut off wavelength value functions to optimize system performance.

20 Claims, 9 Drawing Sheets

QUANTUM DOT NANO CRYSTAL LCD BACKLIGHT SYSTEM AND RELATED METHOD

FIELD OF THE INVENTION

The present invention relates generally to display methods and layers of display systems. More particularly, embodiments of the present invention relate to a system and method for employing a quantum dot nano crystal layer within a display assembly for increased spectrum conversion from a broad spectrum of ultraviolet (UV) energy to a visual wavelength.

BACKGROUND OF THE INVENTION

Nano crystals or Quantum dot emissions may be uniquely tuned in wavelength outputs and possess very high conversion efficiencies. These properties may be potentially useful for display applications. Traditional implementation of nano crystals may use a blue Light Emitting Diode (LED) as a pump source. The blue LED pump source allows a portion of the blue wavelength to be converted to green and red wavelengths but also to be used as the emission source for the blue light projected from the Liquid Crystal Display (LCD). One drawback of the technology is that some of the blue LED pump emission spectrum will pass through the conversion layer in an unconverted state and the luminance ratio of the display being biased towards the pumping spectrum.

Polarization recycling filters offer some level of light recycling to increase efficiency. The concept being to recycle a portion of the energy that was not converted in a single pass through the nano crystal.

Another attempt at increasing the conversion of the pump wavelength has been incorporation of the nano crystals in a diffusing medium thus increasing the effective path length of the light. This diffusing medium does increase overall conversion but also suffers from losses into the backlight cavity.

Consequently, a need exists for an effective system and method for increasing spectrum conversion of an blue LED pump.

SUMMARY OF THE INVENTION

Accordingly, an embodiment of the present invention is directed to a system for efficient conversion of light through a display assembly, comprising: a light source configured to emit a light spectrum, a quantum dot nano crystal layer adjacent to the light source, the quantum dot nano crystal layer configured for conversion of the light spectrum from a first wavelength to a second wavelength, a dielectric mirror layer adjacent to the quantum dot nano crystal layer, the dielectric mirror layer more distal from the light source than the quantum dot nano crystal layer, the dielectric mirror layer configured for reflection of a first portion of the emitted light spectrum toward the quantum dot nano crystal layer, the dielectric mirror layer further configured for transmission of a second portion of the emitted light spectrum, and the quantum dot nano crystal layer is further configured for conversion of the reflected first portion of the emitted light spectrum from a third wavelength to the second wavelength.

An additional embodiment of the present invention may provide a system where first portion of the emitted light spectrum and the second portion of the emitted light spectrum reflected by the dielectric mirror layer are constant or are actively controlled via an external input.

An additional embodiment of the present invention may provide a system where the first wavelength spectrum is shorter than the second wavelength spectrum, the second wavelength is visible and the first wavelength equals the third wavelength.

An additional embodiment of the present invention may provide a system where the first portion is visible blue and the second portion is visible red and visible green and the quantum dot nano crystal layer and the dielectric mirror layer are configured to convert an emitted spectrum from one of: a blue light emitting diode light source, a white light emitting diode light source and an ultraviolet light source.

An additional embodiment of the present invention may provide a method for efficient conversion of light through a display assembly, comprising: emission of a light spectrum from a light source, conversion of the light spectrum from a first wavelength to a second wavelength by a quantum dot nano crystal layer adjacent to the light source, reflection of a first portion of the emitted light spectrum toward the quantum dot nano crystal layer by a dielectric mirror layer adjacent to the quantum dot nano crystal layer, the dielectric mirror layer more distal from the light source than the quantum dot nano crystal layer, transmission of a second portion of the emitted light spectrum by the dielectric mirror layer, and conversion of the reflected first portion of the emitted light spectrum from a third wavelength to the second wavelength by the quantum dot nano crystal layer.

An additional embodiment of the present invention may provide a method for efficient conversion of light through a display assembly, comprising: means for emission of a light spectrum, means for conversion of the light spectrum from a first wavelength to a second wavelength, means for reflection of a first portion of the emitted light spectrum toward the quantum dot nano crystal layer, the reflection means occurs after the conversion means, and means for transmission of a second portion of the emitted light spectrum, wherein the conversion means is further configured for conversion of the reflected first portion of the emitted light spectrum from a third wavelength to the second wavelength.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system and related method for employing a quantum dot nano crystal layer within a display assembly for increased spectrum conversion from a broad spectrum of UV energy to a visual wavelength. However, skilled artisans will recognize additional spectrum conversion techniques function within the scope of the present invention.

In one embodiment of the present invention, systems herein may control, from a narrow to a broad spectrum, the wavelengths of conversion from UV to visible. Further, a single pass through a material may be insufficient to convert a desired amount of light with the nano crystals. Embodiments herein may convert additional energy through reflection into a cavity for "multiple passes" for reconversion by the nano crystal to a visible wavelength.

In embodiments, systems herein may preferably employ a UV source, a UV filter blocking all UV, followed by a layer of quantum dot nano crystals for accepting a broad wavelength band and converting to a more sharply defined band of desired wavelength to increase transmissivity of an LCD at the desired wavelength.

One embodiment of the present invention may comprise a desired layer of quantum dot nano crystals including blue nano crystals, green nano crystals, and red nano crystals enabling a display of one gamut of desired colors. One sharply defined band of desired wavelength may include a visual wavelength band.

Some embodiments of the present invention may include a filtering concept including selecting a specific wavelength of light. This selection may be a mechanical process in manufacture selectively controlling a specific wavelength which remains stationary during operation. This specific wavelength of light may then be physically filtered by layered elements of embodiments herein.

Additionally, embodiments of the present invention may actively and dynamically control the specific wavelength during operation. Elements of the present invention may function to actively alter a targeted specific wavelength or band for inclusion or exclusion from the desired emission.

Figure 1:
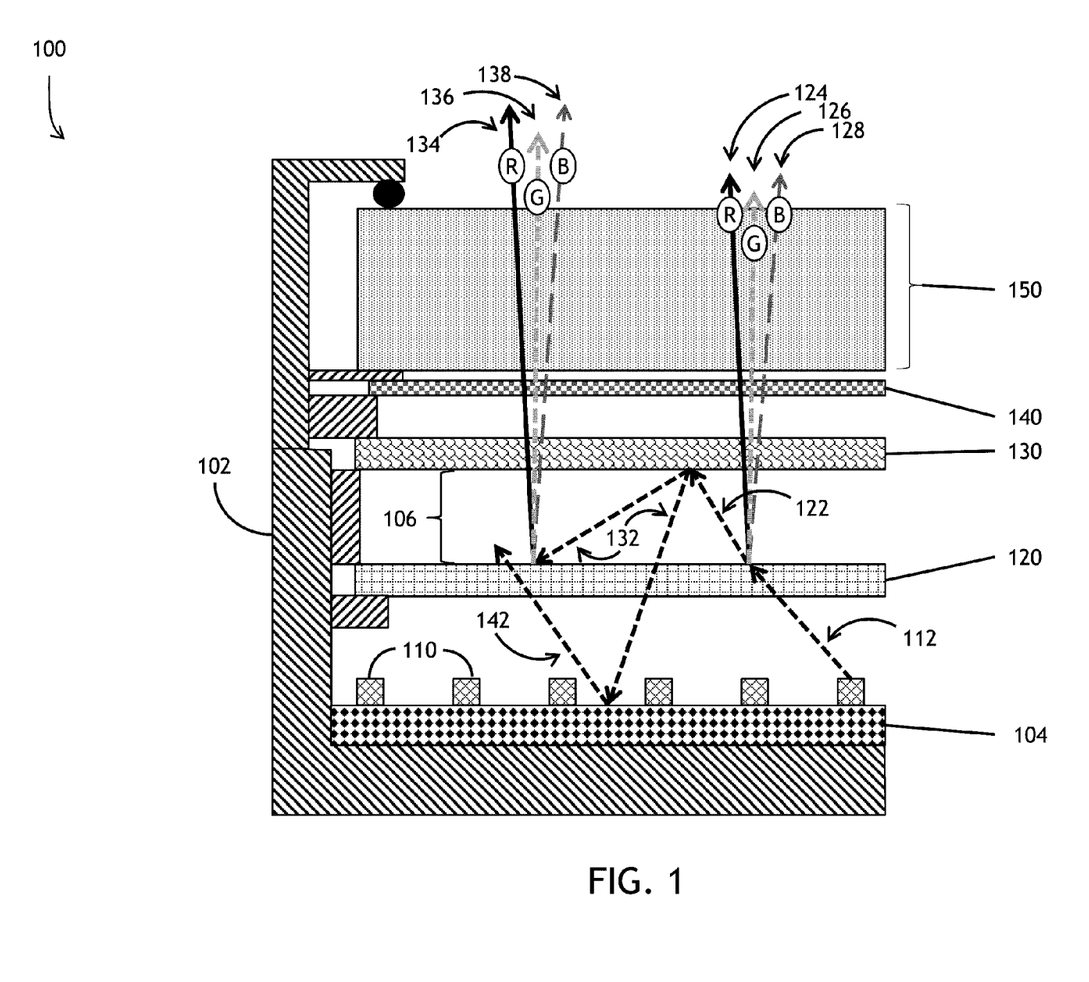
FIG. 1 is a diagram of a system for efficient conversion of light energy through a liquid crystal display assembly illustrative of an embodiment of the present invention.

Referring to FIG. 1, a diagram of a system for efficient conversion of light energy through a liquid crystal display assembly illustrative of an embodiment of the present invention is shown. System 100 may comprise a display assembly 102 backlight with an associated chassis. A LED Printed Wiring Board (PWB) 104 with an associated light source 110. The light source 110 may preferably be one of white, royal blue and UV emitting a pump spectrum of light 112.

A quantum dot nano crystal layer 120 may convert shorter wavelength light from pump spectrum 112 to a longer wavelength light including visible blue 128 while allowing visible red 124 and visible green 126 to pass. However, not all light may be converted by the quantum dot nano crystal layer 120 leaving a portion 122 of the light remaining unconverted. System 100 may efficiently reconvert this unconverted portion 122 of light through reflection and re-excitation of the quantum dot nano crystal layer 120.

A dielectric mirror layer 130 may reflect the unconverted portion 122 of light back into the cavity as a reflected portion 132. The dielectric mirror layer 130 may function as an interference filter for recycling UV light back into the cavity. The reflected portion 132 may then excite the quantum dot nano crystal layer 120 and be reconverted to a desired wavelength red 134, green 136, and blue 138. Some of the reflected portion 132 may also continue back to the LED PWB 104 and be reflected for further transmission 142. System 100 may be configured with a specific dielectric mirror layer 130 allowing red 124 and green 126 to pass unreflected through the dielectric mirror layer 130 while a portion of the blue 128 is reflected.

In some configurations of System 100, a specific dielectric mirror layer 130 may allow a portion of the blue 128 of greater luminance and phototropic eye response to pass through the dielectric mirror layer 130 while reflecting a reflected portion 132 of the blue 128 to which the nano crystals within quantum dot nano crystal layer 120 may specifically respond. This reflected portion 132 may include a specifically targeted wavelength for desired reflection and conversion of a shorter wavelength from the source to a longer wavelength visible by a user. The blue 128 forms one portion of light the dielectric mirror layer 130 may be tuned to a specifically targeted wavelength to reflect.

System 100 may function independent of the physical geometry of associated layers. System 100 may employ a cavity 106 between quantum dot nano crystal layer 120 and dielectric mirror layer 130 to conform to display geometry constraints. Since wavelengths of targeted light bands are relatively small, the function of system 100 may be independent of cavity size 106.

Diffuser plate 140 forms the rear of a well-known LCD stack 150 for transmission of each of the first portion of red 124, green and 126 blue 128 and reconverted portion red 134, green 136 and blue 138.

In on embodiment, a UV light source excites a plurality of colors within quantum dot nano crystal layer 120. Within the quantum dot nano crystal layer 120, blue nano crystals emit blue, red nano crystals emit red, and green nano crystals emit green for a desired gamut of color spectrum transmission.

Figure 2:
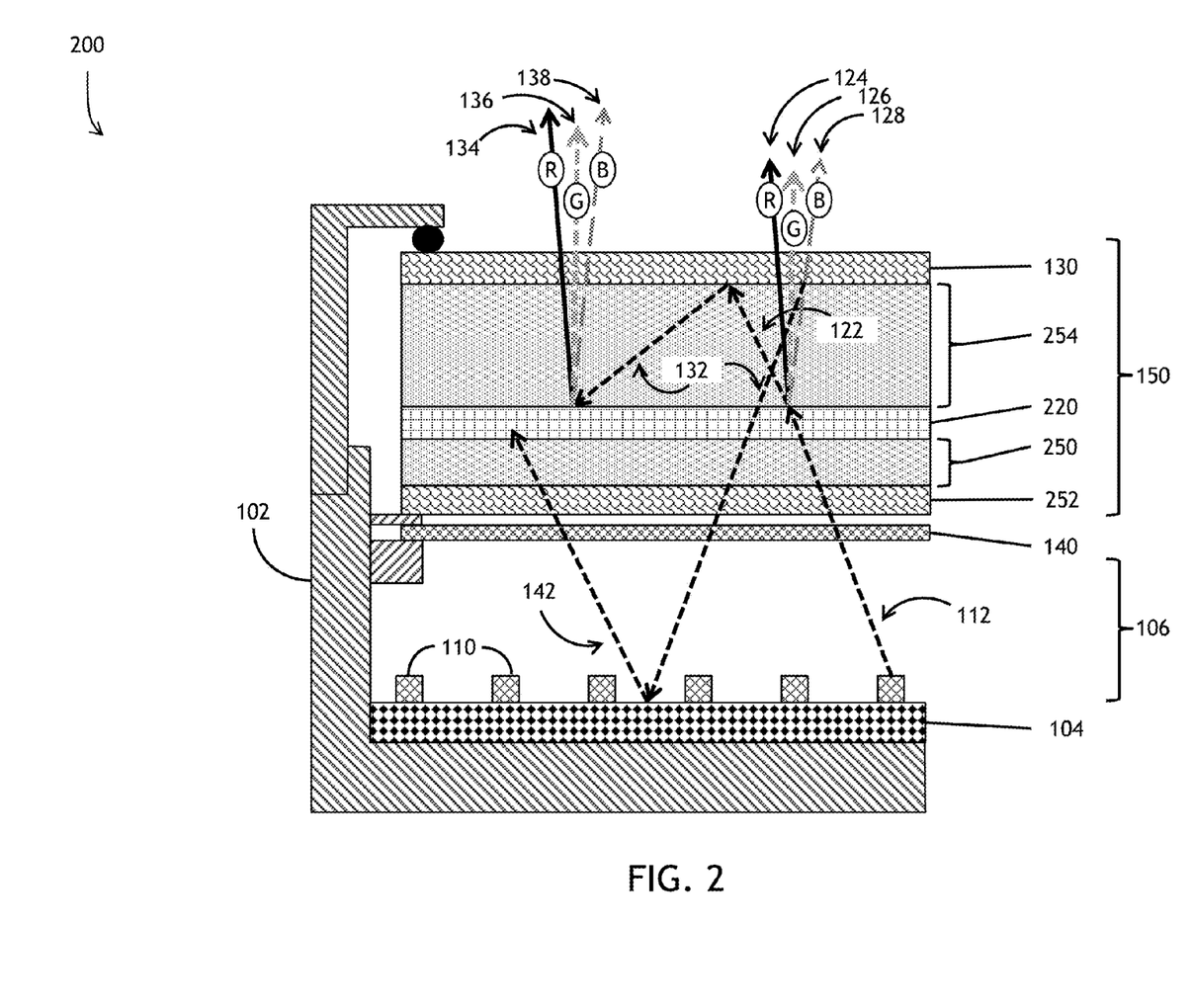
FIG. 2 is a diagram of a system for efficient conversion of light energy through an embedded liquid crystal display assembly illustrative of an embodiment of the present invention.

Referring to FIG. 2, a diagram of a system for efficient conversion of light energy through an embedded liquid crystal display assembly illustrative of an embodiment of the present invention is shown. Preferably, one embodiment of the present invention may include a pixelated (e.g., red, green and blue pixel elements, etc.) quantum dot nano crystal layer 220 aligned with a Thin Film Transistor (TFT)

substrate 250 and a front pixel mask substrate 254 embedded within the LCD optical stack 150. In this embodiment, placement of the dielectric mirror layer 130 may function best at the top of the LCD optical stack 150. In addition, a secondary, pixelated dielectric light rejection filter 252 may be placed on the bottom of TFT substrate 250 to enhance color purity.

In this configuration, system 200 may employ select quantum dot material within pixelated quantum dot nano crystal layer 220 (one element with red material, one element for green, etc.). System 200 may then apply the pixelated dielectric light rejection filter 252 to properly recycle each wavelength band for each pixel element.

System 200 may increase transmissivity of the display assembly 102 employing pixelated quantum dot nano crystal layer 220 to convert wavelengths from shorter to longer. As before, dielectric mirror layer 130 may reflect unconverted portion 122 to reflected portion 132 for reconversion to visible red 134, visible green 136 and visible blue 138.

System 200 may efficiently reconvert this unconverted portion 122 of light through reflection and re-excitation of the pixelated quantum dot nano crystal layer 220.

In addition, system 200 may employ specific coatings which may respond to outside stimuli offering a level of control of the transmissivity. Such specific coatings may include manufactured layers embedded within dielectric mirror layer 130.

Figure 3:
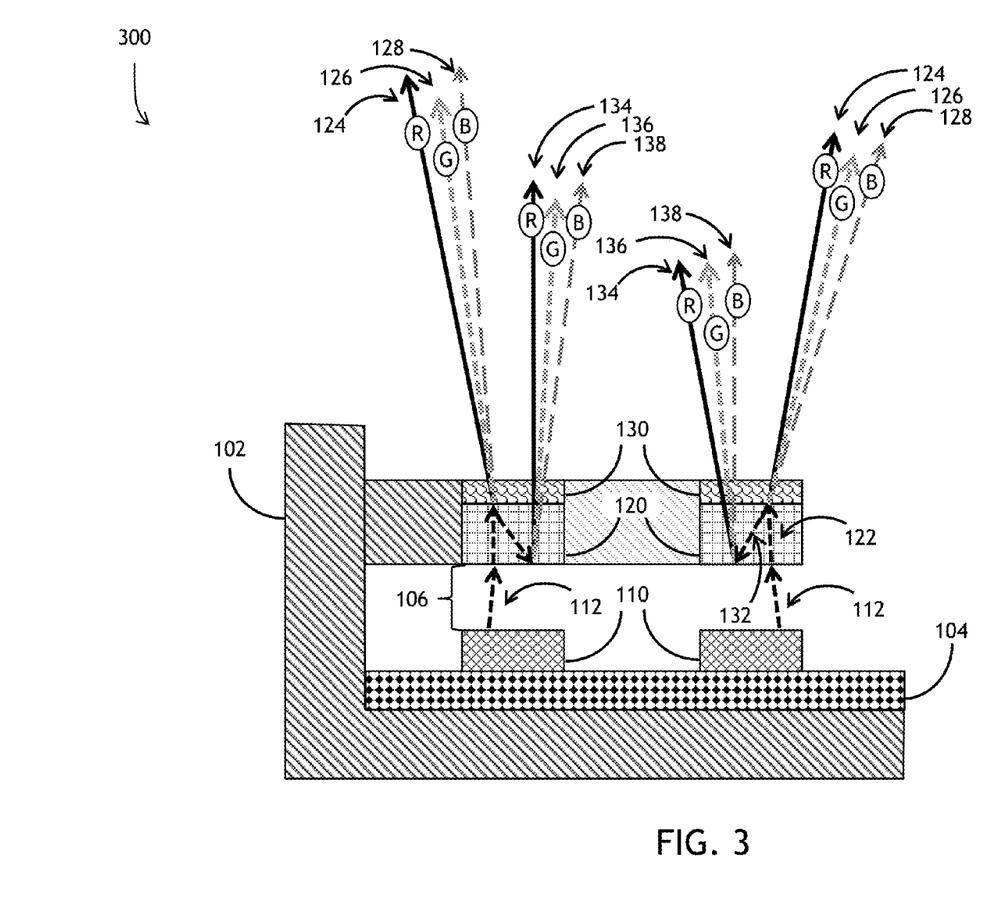
FIG. 3 is a diagram of a system, configured proximal within a display assembly, for efficient conversion of light energy through the display assembly of a light emitting diode illustrative of an embodiment of the present invention.

Referring to FIG. 3, a diagram of a system, configured proximal within a display assembly, for efficient conversion of light energy through the display assembly of a light emitting diode illustrative of an embodiment of the present invention is shown. One embodiment of the present invention may include a quantum dot nano crystal layer 120 configured proximal with the dielectric mirror layer 130 above an LED light source 110. Pump spectrum 112 emits from LED light source 110 and enters and excites quantum dot nano crystal layer 120. Quantum dot nano crystal layer 120 may convert shorter wavelength light from pump spectrum 112 to a longer wavelength light including visible blue 128 while allowing visible red 124 and visible green 126 to pass.

System 300 may employ a cavity 106 within which pump spectrum 112 may travel before reaching quantum dot nano crystal layer 120. Reflected portion 132 of blue 128 may excite quantum dot nano crystal layer 120 for reconversion to one of visible spectra 134, 136, 138.

The recycling and conversion may occur within the display assembly 102 over a plurality of passes. For example, on a first pass, dielectric mirror layer 130 of system 300 may allow a specific amount of light to transmit as visible 124, 126, 128 while a specific portion 132 is reflected. This reflected portion 132 may 1) excite quantum dot nano crystal layer 120 for reconversion to visible 134, 136, 138, and 2) is reflected within cavity 106 as an additional pass through quantum dot nano crystal layer 120 for conversion to visible. The recycling and conversion may continue over many passes until pump excitation is exhausted.

Figure 4:
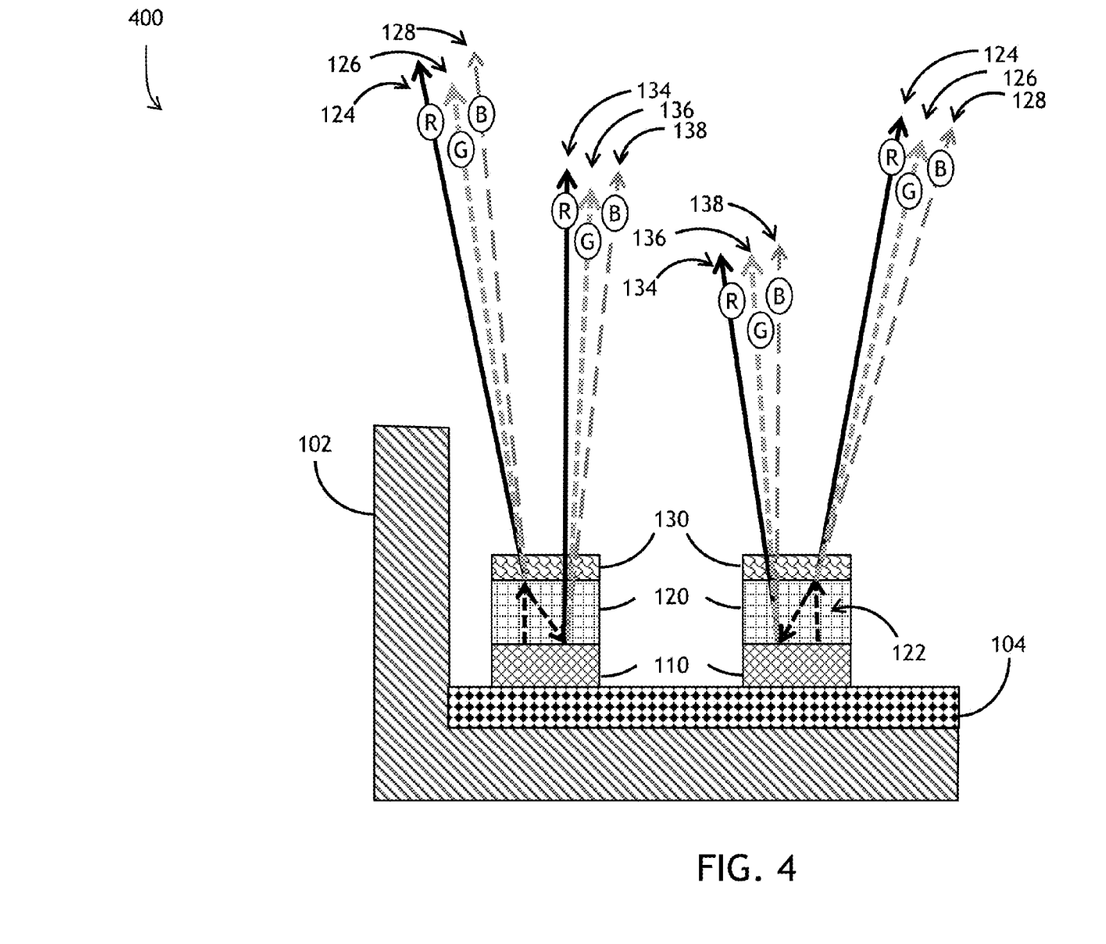
FIG. 4 is a diagram of a system for efficient conversion of light energy through a compact display assembly of a light emitting diode illustrative of an embodiment of the present invention.

Referring to FIG. 4, a diagram of a system for efficient conversion of light energy through a compact display assembly of a light emitting diode illustrative of an embodiment of the present invention is shown. System 400 may include LED PWB 104, light source 110, quantum dot nano crystal layer 120 and dielectric mirror layer 130 configured proximal within display assembly 102.

Figure 5:
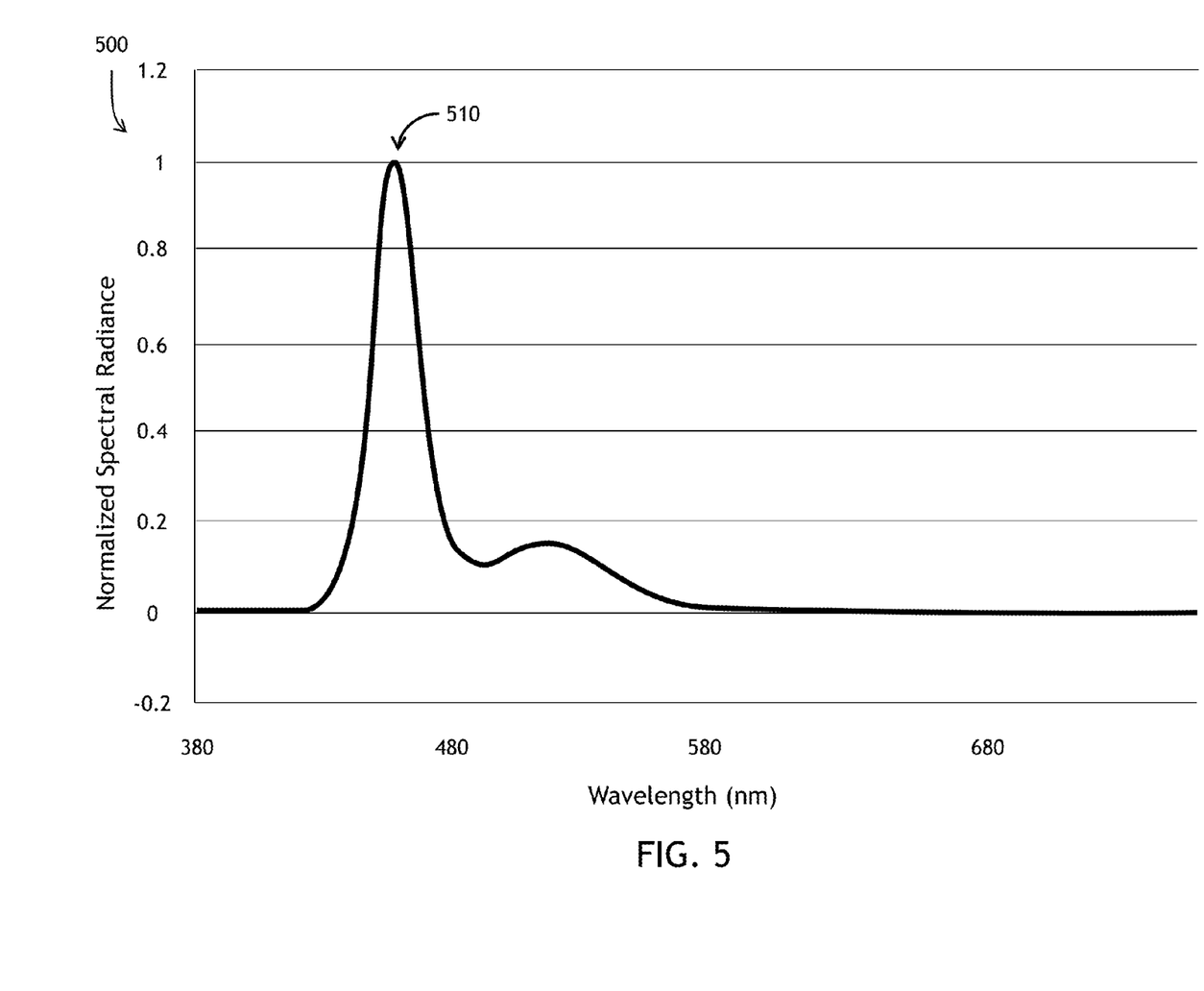
FIG. 5 is a graph of normalized spectral radiance of a pump emission over wavelength exemplary of an embodiment of the present invention.

Referring to FIG. 5, a graph of normalized spectral radiance of a pump emission over wavelength exemplary of an embodiment of the present invention is shown. Systems 100 through 400 may employ an exemplary white light source 110 emitting a pump spectrum 112. As shown in graph 500, a peak 510 of white radiance is indicated at approximately 450 nm. While an exemplary white light source pump curve is indicated with a peak radiance near 450 nm 510, additional colors of light source may function within the scope of the present invention. For example, a blue LED in multiple wavelengths and UV LED light sources are contemplated as functional within the scope of the present invention.

Figure 6:
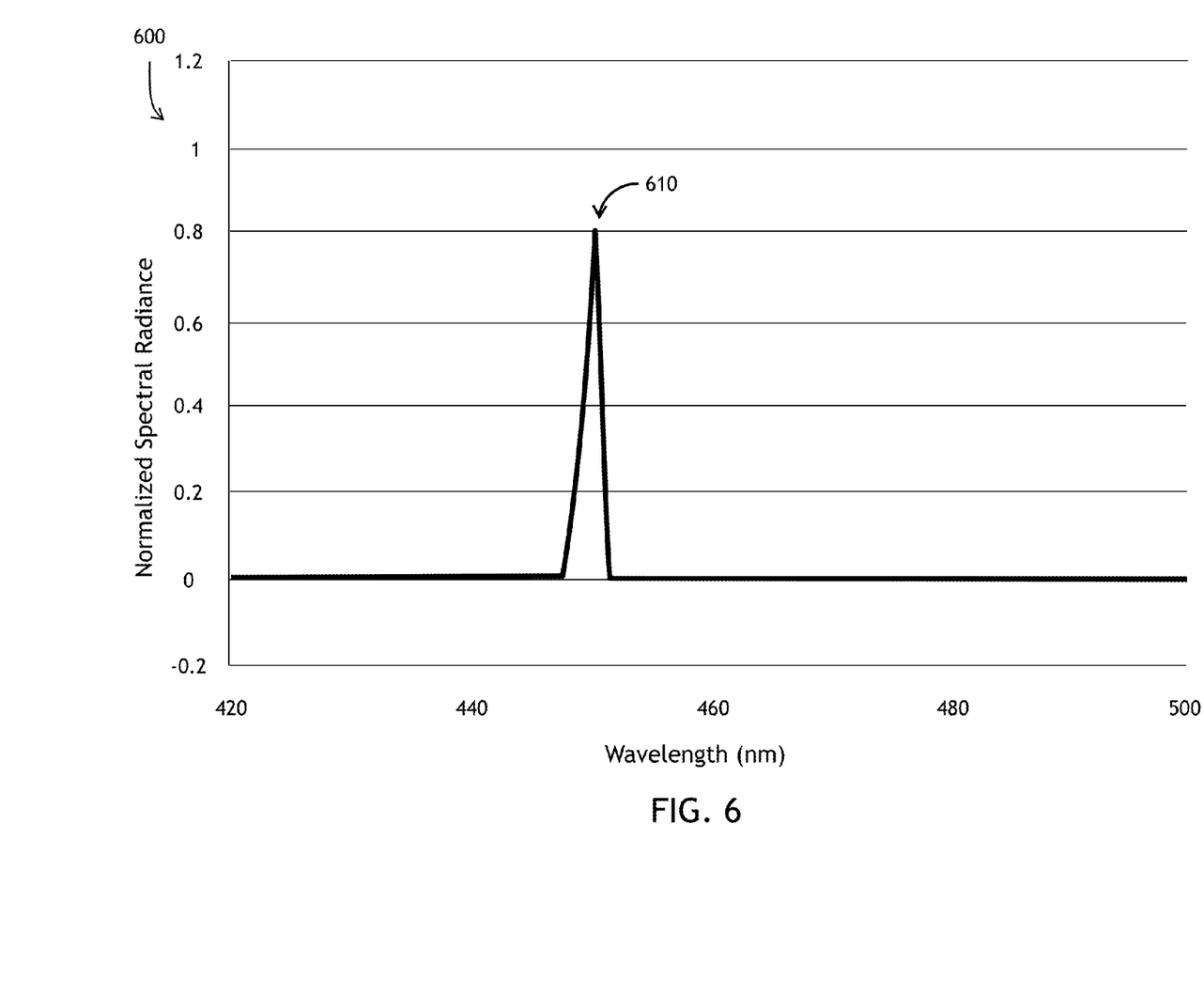
FIG. 6 is a graph of spectral radiance reflected back into a cavity exemplary of an embodiment of the present invention.

Referring to FIG. 6, a graph of spectral radiance reflected back into a cavity exemplary of an embodiment of the present invention is shown. Systems herein may employ a specific dielectric mirror layer 130 tuned to reflect a specific wavelength band with a specific cut-off wavelength of light back toward the quantum dot nano crystal layer 120 for recycling and further conversion. As graph 600 indicates, this targeted wavelength 610 may be specifically tuned to maximize performance of quantum dot nano crystal layer 120 for reconversion and further transmission as visible red 134, green 136 and blue 138. Here, an exemplary 450 nm is tuned to reflect back toward quantum dot nano crystal layer 120 for reconversion.

As previously indicated, systems 100 through 400 may actively target a desired wavelength for reflection back toward quantum dot nano crystal layer 120. This active control of a targeted wavelength may dynamically increase performance of the overall display assembly 102. For example, a specific wavelength of blue 128 may be targeted for reflection and reconversion for a specific display configuration. An exemplary 470 nm may be the desired and therefore targeted wavelength for reconversion for a specific display quality. Alternatively an exemplary 440 nm may be the desired and therefore targeted wavelength for reconversion for an additional specific display quality. As reflected portion 132 may be targeted, transmission spectrum through dielectric mirror layer 130 may also be targeted.

Figure 7:
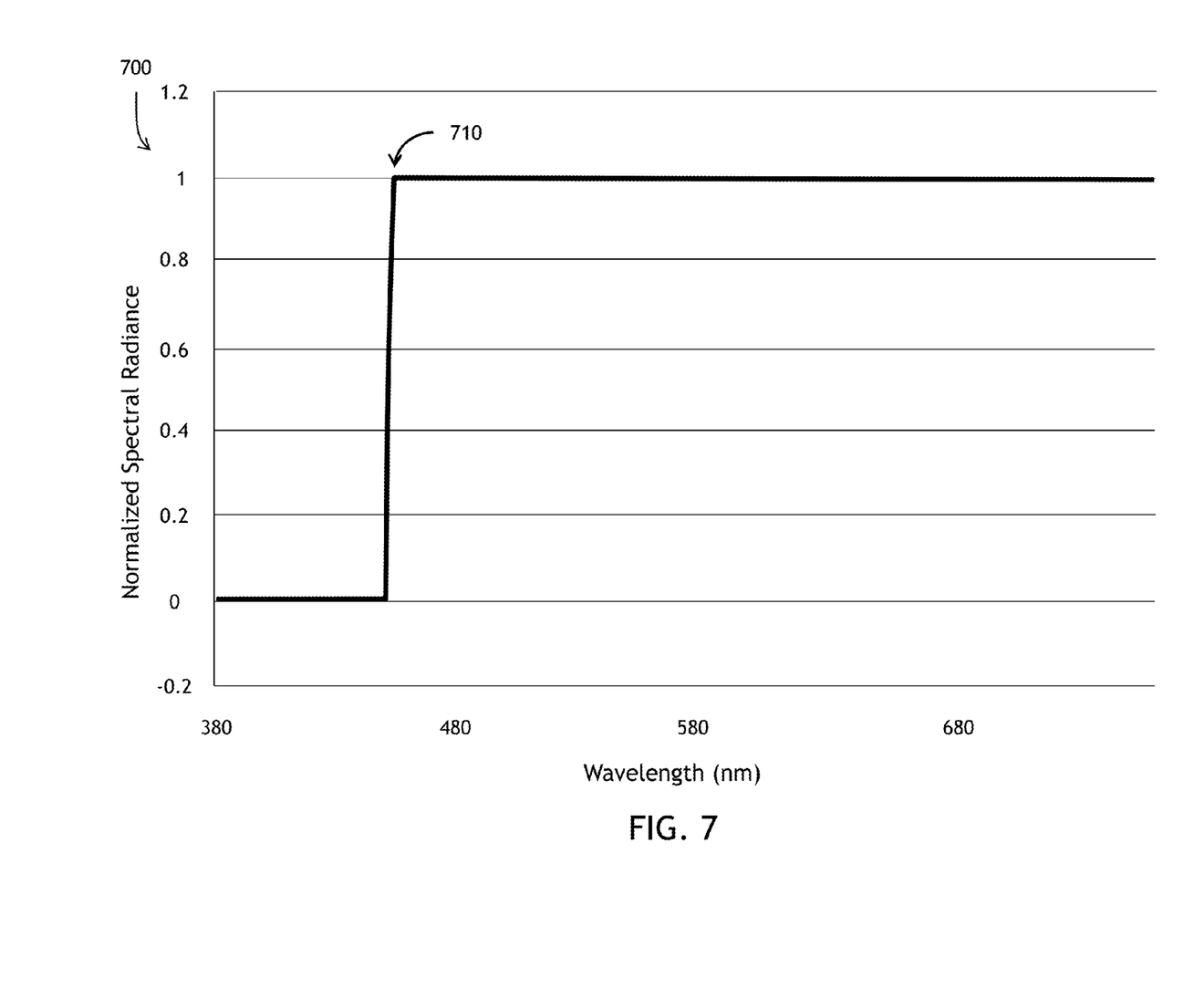
FIG. 7 is a graph of dielectric filter transmission spectrum exemplary of an embodiment of the present invention.

Referring to FIG. 7, a graph of dielectric filter transmission spectrum exemplary of an embodiment of the present invention is shown. As graph 700 indicates, transmission spectrum of dielectric mirror layer 130 may be indicated as all levels above an exemplary specific cut-off wavelength, here approximately 450 nm 710. At specific wavelengths of transmission, systems 100 through 400 may maintain control of transmission spectra as well as reflected spectra.

Figure 8:
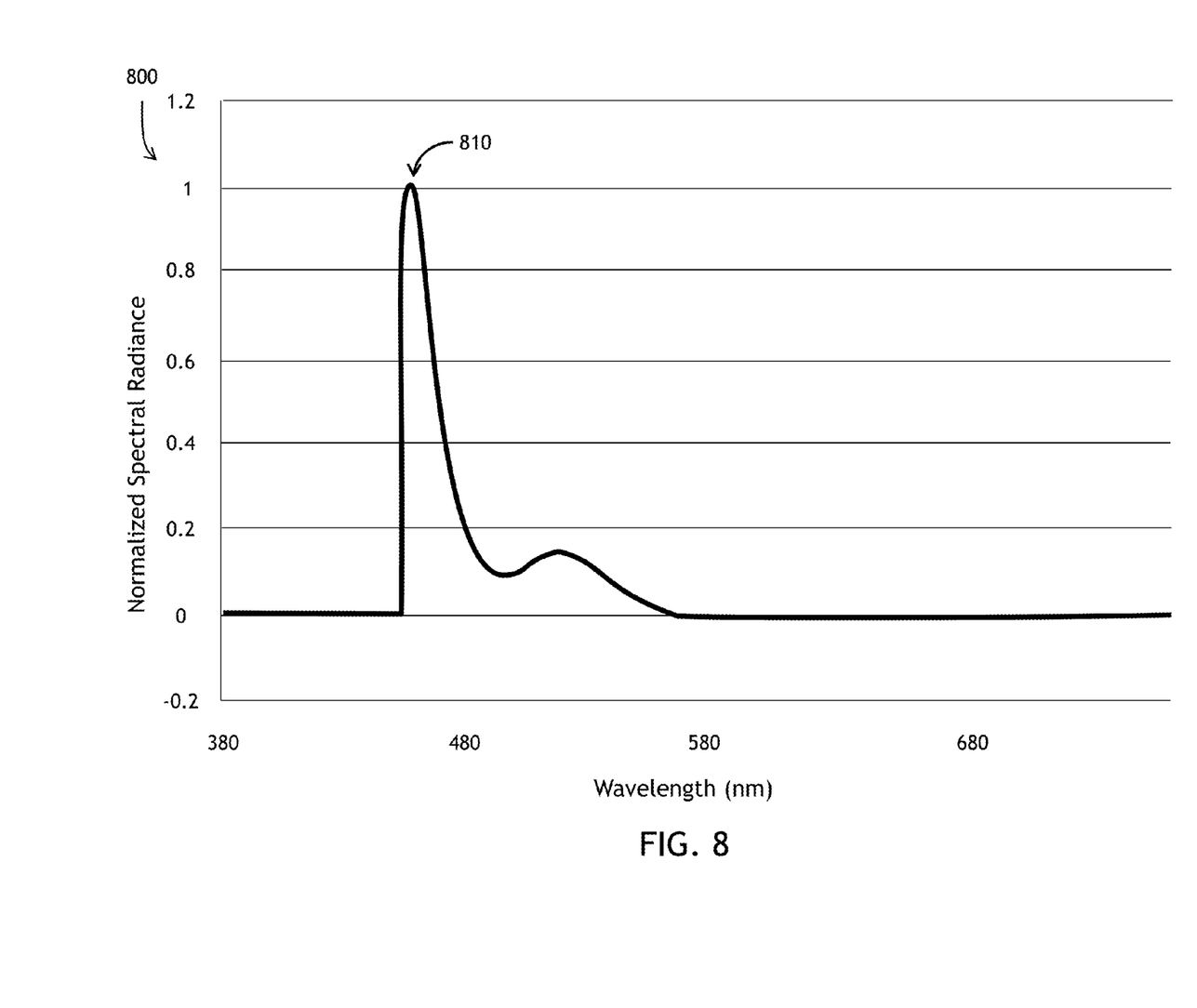
FIG. 8 is a graph of exemplary spectrum transmitted by an embodiment of the present invention.

Referring to FIG. 8, a graph of exemplary spectrum transmitted by an embodiment of the present invention is shown. One exemplary level of transmitted spectrum radiance may be derived from a combination of spectrum emitted by a source pump (FIG. 5) and spectrum not filtered by Dielectric Filter (FIG. 7). For example, a multiplication of pump spectrum by dielectric filter transmission spectrum may yield a portion of spectrum actually transmitted (FIG. 8). As shown in graph 800, a peak 810 indicated near approximately 460 nm may be the targeted transmission spectrum for a specific display characteristic.

System 100 may be specifically configured for application within a plurality of display systems. For example, one embodiment of the present invention may be specifically configured for, without limitation, application within a projection display system while another embodiment of the present invention may be configured for a heads up display system.

Figure 9:
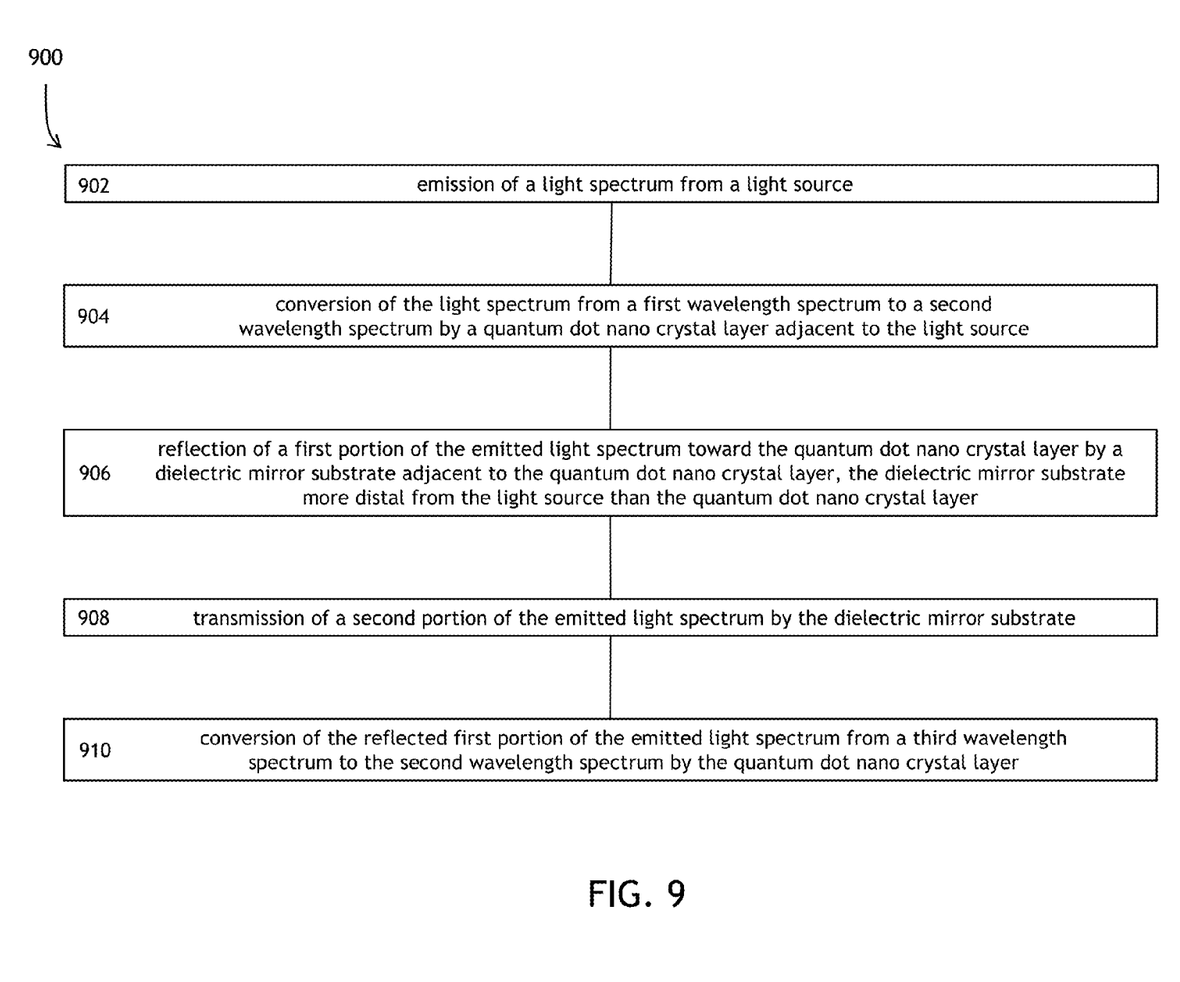
FIG. 9 is a flow chart of a method for efficient conversion of light energy through a display assembly illustrative of an embodiment of the present invention.

Referring to FIG. 9, a flow chart of a method for efficient conversion of light energy through a display assembly illustrative of an embodiment of the present invention is shown. Method 900 begins at step 902 with emission of a light spectrum from a light source, and, at step 904 with conversion of the light spectrum from a first wavelength to a second wavelength by a quantum dot nano crystal layer adjacent to the light source, and, at step 906 with reflection of a first portion of the emitted light spectrum toward the quantum dot nano crystal layer by a dielectric mirror layer adjacent to the quantum dot nano crystal layer, the dielectric mirror layer more distal from the light source than the quantum dot nano crystal layer, and, at step 908 with transmission of a second portion of the emitted light spectrum by the dielectric mirror layer, and, at step 910 with conversion of the reflected first portion of the emitted light spectrum from a third wavelength to the second wavelength by the quantum dot nano crystal layer.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system for efficient conversion of light through a display assembly, comprising:
    a light source configured to emit a light spectrum comprising a first wavelength spectrum;
    a quantum dot nano crystal layer, the quantum dot nano crystal layer configured for conversion of the light spectrum from the first wavelength spectrum to a second wavelength spectrum; and
    a dielectric mirror layer, the dielectric mirror layer more distal from the light source than the quantum dot nano crystal layer, the dielectric mirror layer configured for reflection of the first wavelength spectrum and for blocking the transmission of the first wavelength spectrum, wherein an unconverted portion of the emitted light spectrum comprising the first wavelength spectrum is substantially reflected by the dielectric mirror layer toward the quantum dot nano crystal layer, the dielectric mirror layer further configured for transmission of the second wavelength spectrum, wherein the quantum dot nano crystal layer is further configured for conversion of the reflected unconverted portion of the emitted light spectrum to the second wavelength spectrum.

2. The system for efficient conversion of light through a display assembly of claim 1, wherein the first wavelength spectrum and the second wavelength spectrum reflected by the dielectric mirror layer are constant.

3. The system for efficient conversion of light through a display assembly of claim 1, wherein at least one of the first wavelength spectrum or the second wavelength spectrum are actively controlled via an external input.

4. The system for efficient conversion of light through a display assembly of claim 1, wherein the first wavelength spectrum comprises shorter wavelengths than the second wavelength spectrum.

5. The system for efficient conversion of light through a display assembly of claim 1, wherein the first wavelength spectrum comprises ultraviolet wavelengths and the second wavelength spectrum comprises visible red, green, and blue wavelengths.

6. The system for efficient conversion of light through a display assembly of claim 1, wherein the quantum dot nano crystal layer and the dielectric mirror layer are configured to convert an emitted spectrum from at least one of a blue light emitting diode light source, a white light emitting diode light source, or an ultraviolet light source.

7. The system for efficient conversion of light through a display assembly of claim 1, wherein the dielectric mirror layer is further configured for reflection of one or more selected wavelengths of the second wavelength spectrum toward the quantum dot nano crystal layer, wherein the quantum dot nano crystal layer is further configured for conversion of the one or more selected wavelengths of the second wavelength spectrum to one or more additional selected wavelengths of the second wavelength spectrum.

8. A method for efficient conversion of light through a display assembly, comprising:
    emission of a light spectrum comprising a first wavelength spectrum from a light source;
    conversion of the light spectrum from the first wavelength spectrum to a second wavelength spectrum by a quantum dot nano crystal layer;
    reflection of an unconverted portion of the emitted light spectrum comprising the first wavelength spectrum toward the quantum dot nano crystal layer by a dielectric mirror layer, the dielectric mirror layer more distal from the light source than the quantum dot nano crystal layer;
    transmission of the second wavelength spectrum by the dielectric mirror layer; and
    converting the reflected unconverted portion of the emitted light spectrum to the second wavelength spectrum by the quantum dot nano crystal layer.

9. The method for efficient conversion of light through a display assembly of claim 8, wherein the first wavelength spectrum and the second wavelength spectrum reflected by the dielectric mirror layer are constant.

10. The method for efficient conversion of light through a display assembly of claim 8, wherein the first wavelength spectrum and the second wavelength spectrum reflected by the dielectric mirror layer are actively controlled via an external input.

11. The method for efficient conversion of light through a display assembly of claim 8, wherein the first wavelength spectrum comprises shorter wavelengths than the second wavelength spectrum.

12. The method for efficient conversion of light through a display assembly of claim 8, wherein the first wavelength spectrum comprises ultraviolet wavelengths and the second wavelength spectrum comprises visible red, green, and blue wavelengths.

13. The method for efficient conversion of light through a display assembly of claim 8, wherein the quantum dot nano crystal layer and the dielectric mirror layer are configured to convert an emitted spectrum from at least one of a blue light emitting diode light source, a white light emitting diode light sourced an ultraviolet light source.

14. The method for efficient conversion of light through a display assembly of claim 8, further comprising:
   reflecting one or more selected wavelengths of the second wavelength spectrum toward the quantum dot nano crystal layer by the dielectric mirror layer; and
   converting the reflected one or more selected wavelengths of the second wavelength spectrum to one or more additional selected wavelengths of the second wavelength spectrum by the quantum dot nano crystal layer.

15. A system for efficient conversion of light through a display assembly, comprising:
   means for emission of a light spectrum comprising a first wavelength spectrum;
   means for conversion of the light spectrum from the first wavelength spectrum to a second wavelength spectrum;
   means for reflection of an unconverted portion of the emitted light spectrum comprising the first wavelength spectrum; and
   means for transmission of the second wavelength spectrum, wherein the conversion means is configured for converting the reflected unconverted portion of the emitted light spectrum to the second wavelength spectrum.

16. The system for efficient conversion of light through a display assembly of claim 15, wherein the reflected first portion of the emitted light spectrum and the reflected second portion of the emitted light spectrum are actively controlled via an external input.

17. The system for efficient conversion of light through a display assembly of claim 15, wherein the first wavelength spectrum comprises shorter wavelengths than the second wavelength spectrum.

18. The system for efficient conversion of light through a display assembly of claim 15, wherein the first wavelength spectrum comprises one or more ultraviolet wavelengths and the second wavelength spectrum comprises visible red, green, and blue wavelengths.

19. The system for efficient conversion of light through a display assembly of claim 15, wherein the light spectrum is one of: a blue light, a white light and an ultraviolet light.

20. The system for efficient conversion of light through a display assembly of claim 15, wherein the dielectric mirror layer is further configured for reflection of one or more selected wavelengths of the second wavelength spectrum toward the quantum dot nano crystal layer, wherein the quantum dot nano crystal layer is further configured for conversion of the one or more selected wavelengths of the second wavelength spectrum to one or more additional selected wavelengths of the second wavelength spectrum.

\* \* \* \* \*